United States Patent [19]

Shimura

[11] Patent Number: 5,301,107

[45] Date of Patent: Apr. 5, 1994

[54] METHOD FOR FORMING ENERGY SUBTRACTION IMAGES

[75] Inventor: Kazuo Shimura, Kanagawa, Japan

[73] Assignee: Fuji Photo Film Co., Ltd., Kanagawa, Japan

[21] Appl. No.: 866,469

[22] Filed: Apr. 10, 1992

[30] Foreign Application Priority Data

Apr. 18, 1991 [JP] Japan .................. 3-086881

[51] Int. Cl.$^5$ ............................. G06F 15/00
[52] U.S. Cl. ......................... 364/413.13; 364/413.22; 250/582; 358/500
[58] Field of Search ................. 364/413.13, 413.22, 364/413.23, 414; 358/75, 451, 456, 443; 250/327.2, 582–587

[56] References Cited

U.S. PATENT DOCUMENTS

| | | | |
|---|---|---|---|
| 4,258,264 | 3/1981 | Kotera et al. | 250/585 |
| 4,276,473 | 6/1981 | Kato et al. | 250/587 |
| 4,315,318 | 2/1982 | Kato et al. | 382/6 |
| 4,387,428 | 6/1983 | Ishida et al. | 382/6 |
| 4,710,875 | 12/1987 | Nakajima et al. | 364/413.23 |
| 4,855,598 | 8/1989 | Ohgoda et al. | 250/327.2 |
| 4,896,037 | 1/1990 | Shimura et al. | 250/583 |
| 5,049,746 | 9/1991 | Ito | 250/327.2 |

FOREIGN PATENT DOCUMENTS 56-11395 2/1981 Japan .
61-5193 2/1986 Japan .

*Primary Examiner*—Roy N. Envall, Jr.
*Assistant Examiner*—Khai Tran
*Attorney, Agent, or Firm*—Sughrue, Mion, Zinn, Macpeak & Seas

[57] ABSTRACT

In energy subtraction processing, a filter for filtering out radiation having a low energy level is located between first and second recording media. Radiation, which has passed through an object, is irradiated from the side of the first recording medium such that only the radiation having a high energy level may impinge upon the second recording medium, radiation images of the object being thereby recorded on the two recording media. Image signals representing the radiation images are subtracted from each other, and an image signal representing an energy subtraction image is thereby obtained. The subtraction process is not carried out on high frequency components of the image signals representing the radiation images and is carried out only on low frequency components of the image signals such that an image signal representing an energy subtraction image having improved graininess may be obtained. A stimulable phosphor sheet is utilized as the filter for filtering out radiation having a low energy level. High frequency components of an image signal, which represents image information stored on the stimulable phosphor sheet, are added to the image signal representing the energy subtraction image, and an image signal representing an energy subtraction image, the graininess of which has been improved even further, is thereby obtained.

9 Claims, 10 Drawing Sheets

METHOD FOR FORMING ENERGY SUBTRACTION IMAGES

BACKGROUND OF THE INVENTION

1. Field of the Invention

This invention relates to a method for forming an energy subtraction image wherein, from a plurality of radiation images, an energy subtraction image is formed which includes little noise and which has good image quality and can serve as an effective tool in, particularly, the efficient and accurate diagnosis of an illness.

2. Description of the Prior Art

Techniques for reading out a recorded radiation image in order to obtain an image signal, carrying out appropriate image processing on the image signal, and then reproducing a visible image by use of the processed image signal have heretofore been known in various fields. For example, as disclosed in Japanese Patent Publication No. 61(1986)-5193, an X-ray image is recorded on an X-ray film having a small gamma value chosen according to the type of image processing to be carried out, the X-ray image is read out from the X-ray film and converted into an electric signal, and the electric signal (image signal) is processed and then used for reproducing the X-ray image as a visible image on a copy photograph, or the like. In this manner, a visible image having good image quality with high contrast, high sharpness, high graininess, or the like, can be reproduced.

Also, when certain kinds of phosphors are exposed to radiation such as X-rays, α-rays, ⊕-rays, γ-rays, cathode rays or ultraviolet rays, they store part of the energy of the radiation. Then, when the phosphor which has been exposed to the radiation is exposed to stimulating rays, such as visible light, light is emitted by the phosphor in proportion to the amount of energy stored thereon during its exposure to the radiation. A phosphor exhibiting such properties is referred to as a stimulable phosphor.

As disclosed in U.S. Pat. Nos. 4,258,264, 4,276,473, 4,315,318, 4,387,428, and Japanese Unexamined Patent Publication No. 56(1981)-11395, it has been proposed to use stimulable phosphors in radiation image recording and reproducing systems. Specifically, a sheet provided with a layer of the stimulable phosphor (hereinafter referred to as a stimulable phosphor sheet) is first exposed to radiation which has passed through an object, such as the human body. In this manner, a radiation image of the object is stored on the stimulable phosphor sheet. The stimulable phosphor sheet, on which the radiation image has been stored, is then scanned with stimulating rays, such as a laser beam, which cause it to emit light in proportion to the amount of energy stored during exposure to the radiation. The light emitted by the stimulable phosphor sheet, upon stimulation thereof, is photoelectrically detected and converted into an electric image signal. The image signal is then used during the reproduction of the radiation image of the object as a visible image on a recording material such as photographic film, on a display device such as a cathode ray tube (CRT), or the like.

Radiation image recording and reproducing systems which use stimulable phosphor sheets are advantageous over conventional radiography using silver halide photographic materials, in that images can be recorded even when the energy intensity of the radiation to which the stimulable phosphor sheet is exposed varies over a wide range. More specifically, since the amount of light which the stimulable phosphor sheet emits when being stimulated varies over a wide range and is proportional to the amount of energy stored thereon during its exposure to the radiation, it is possible to obtain an image having a desirable density regardless of the energy intensity of the radiation to which the stimulable phosphor sheet was exposed. In order for the desired image density to be obtained, an appropriate read-out gain is set when the emitted light is being detected and converted into an electric signal (image signal) to be used in the reproduction of a visible image on a recording material, such as photographic film, or on a display device, such as a CRT.

In the radiation image recording and reproducing systems wherein recording media, such as X-ray film or stimulable phosphor sheets, are used, subtraction processing techniques for radiation images are often carried out on image signals detected from a plurality of radiation images of an object which have been recorded on the recording media.

With the subtraction processing techniques for radiation images, an image is obtained which corresponds to a difference between a plurality of radiation images of an object recorded under different conditions. Specifically, a plurality of the radiation images recorded under different conditions are read out at predetermined sampling intervals, and a plurality of image signals thus detected are converted into digital image signals which represent the radiation images. The image signal components of the digital image signals which represent the image information recorded at corresponding sampling points in the radiation images are then subtracted from each other. A difference signal is thereby obtained which represents the image of a specific structure or part of the object represented by the radiation images.

Basically, subtraction processing is carried out with either the so-called temporal (time difference) subtraction processing method or the so-called energy subtraction processing method. In the former method, in order for the image of a specific structure (for example, a blood vessel) of an object to be extracted from the image of the whole object, the image signal representing a radiation image obtained without injection of contrast media is subtracted from the image signal representing a radiation image in which the image of the specific structure (for example, a blood vessel) of the object is enhanced by the injection of contrast media. In the latter method, such characteristics are utilized that a specific structure of an object exhibits different levels of radiation absorptivity with respect to radiation with different energy levels. Specifically, an object is exposed to several kinds of radiation with different energy levels, and a plurality of radiation images are thereby obtained in which different images of a specific structure are embedded. Thereafter, the image signals representing the plurality of the radiation images are weighted appropriately and subjected to a subtraction process in order to extract the image of the specific structure. The applicant proposed novel energy subtraction processing methods using stimulable phosphor sheets in, for example, U.S. Pat. Nos. 4,855,598 and 4,896,037.

A plurality of radiation images, which are subjected to energy subtraction processing, will herein be referred to as the "original images". An image signal representing a subtraction image is obtained by subtracting the image signals representing the original images from each other. Therefore, the image signal representing the subtraction image has a lower signal-to-noise ratio (S/N ratio) than the image signals representing the original images. As a result, the problems occur in that the image quality of the subtraction image becomes worse than the image quality of the original images.

By way of example, energy subtraction processing is often carried out in the manner described below. Specifically, an object, such as the chest of a human body, which is constituted of soft tissues and bones, is exposed to several kinds of radiation with different energy levels, and a plurality of radiation images of the object are thereby obtained. The plurality of the radiation images are read out, and a plurality of image signals representing the radiation images are generated. Energy subtraction processing is then carried out on the plurality of the image signals. From the energy subtraction processing, a soft tissue image signal is obtained which represents a soft tissue image primarily composed of patterns of the soft tissues of the object. Alternatively, a bone image signal is obtained which represents a bone image primarily composed of patterns of the bones of the object. Thereafter, the soft tissue image is reproduced as a visible image from the soft tissue image signal, or the bone image is reproduced as a visible image from the bone image signal. In the soft tissue image, the patterns of the bones have been erased. Therefore, patterns, which were behind the bone patterns or were rendered imperceptible by the bone patterns in the original images, become more perceptible in the soft tissue image than in the original images. Also, in the bone image, the patterns of the soft tissues have been erased. Therefore, patterns, which were behind the soft tissue patterns or were rendered imperceptible by the soft tissue patterns in the original images, become more perceptible in the bone image than in the original images. Accordingly, a subtraction image can be obtained which is well matched to the purposes of diagnosis. However, because the soft tissue image and the bone image re obtained from the subtraction processing, the problems occur in that noise components have been emphasized in the soft tissue image and the bone image than in the original images. From this point of view, the image quality of the soft tissue image and the bone image could not heretofore been kept good.

Accordingly, in U.S. patent application Ser. No. 654,450, the applicant proposed a first method for forming an energy subtraction image wherein, from a plurality of original images, a subtraction image is formed in which noise has been reduced to approximately the same level as that in original images and which has good image quality and can serve as an effective tool in, particularly, the efficient and accurate diagnosis of an illness. The proposed first method comprises the steps of:

i) after a plurality of radiation images (e.g., a radiation image recorded with radiation having a high energy level and a radiation image recorded with radiation having a low energy level) of an object are recorded on recording media by irradiating several kinds of radiation with different energy levels (e.g., radiation having a high energy level and radiation having a low energy level) to said object, which is constituted of a plurality of tissues (e.g., bones and soft tissues) exhibiting different levels of radiation absorptivity with respect to the several kinds of radiation with different energy levels, and a plurality of original image signals representing the plurality of said radiation images (e.g., an image signal representing the radiation image recorded with the radiation having a high energy level and an image signal representing the radiation image recorded with the radiation having a low energy level) are then detected, generating a first image signal (e.g., a bone image signal), which represents a first image primarily composed of patterns of first tissues (e.g., the bones) of said object, from the plurality of said original image signals, ii) generating a first smoothed image signal by processing said first image signal (e.g., the bone image signal), said first smoothed image signal representing a first smoothed image in which noise components of said first image have been reduced or eliminated, and iii) generating a second image signal (e.g., a soft tissue image signal) by subtracting said first smoothed image signal from an original image signal, said second image signal representing a second image primarily composed of patterns of second tissues (e.g., the soft tissues) of said object.

The proposed first method for forming an energy subtraction image may be embodied in various, substantially identical manners. For example, each of the steps of the first method for forming an energy subtraction image may be divided even further into a plurality of steps. Alternatively, the operations may be carried out in different orders.

By way of example, as one of the embodiments which are substantially identical with the aforesaid first method for forming an energy subtraction image, an embodiment has been proposed which comprises the steps of:

i) after a plurality of radiation images (e.g., a radiation image recorded with radiation having a high energy level and a radiation image recorded with radiation having a low energy level) of an object are recorded on recording media by irradiating several kinds of radiation with different energy levels (e.g., radiation having a high energy level and radiation having a low energy level) to said object, which is constituted of a plurality of tissues (e.g., bones and soft tissues) exhibiting different levels of radiation absorptivity with respect to the several kinds of radiation with different energy levels, and a plurality of original image signals representing the plurality of said radiation images (e.g., an image signal representing the radiation image recorded with the radiation having a high energy level and an image signal representing the radiation image recorded with the radiation having a low energy level) are then detected, generating a first image signal (e.g., a bone image signal), which represents a first image primarily composed of patterns of first tissues (e.g., the bones) of said object, and a second image signal (e.g., a soft tissue image signal), which represents a second image primarily composed of patterns of second tissues (e.g., the soft tissues) of said object, from the plurality of said original image signals, ii) generating a noise image signal by processing said first image signal (e.g., the bone image signal), said noise image signal representing a noise image in which components representing the patterns of said first tissues and primarily constituting low spatial frequency components of said first image have been reduced or eliminated, and iii) generating a new second image signal by adding said noise image signal to said second image signal (e.g., the soft tissue image signal), said new second image signal representing a new second image primarily composed of the patterns of said second tissues (e.g., the soft tissues) of said object.

The applicant also proposed a second method for forming an energy subtraction image, which comprises the steps of:

i) after a plurality of radiation images of an object are recorded on recording media by irradiating several kinds of radiation with different energy levels to said object, which is constituted of a plurality of tissues exhibiting different levels of radiation absorptivity with respect to the several kinds of radiation with different energy levels, and a plurality of original image signals representing the plurality of said radiation images are then detected, carrying out a first process for generating a first image signal, which represents a first image primarily composed of patterns of first tissues of said object, from the plurality of said original image signals, thereafter carrying out a second process, which comprises the steps of:

a) generating a first smoothed image signal by processing said first image signal, said first smoothed image signal representing a first smoothed image in which noise components of said first image have been reduced, and b) generating a second image signal by subtracting said first smoothed image signal from an original image signal, said second image signal representing a second image primarily composed of patterns of second tissues of said object, and iii) thereafter carrying out a third process, which comprises the steps of:

a) generating a second smoothed image signal by processing said second image signal, said second smoothed image signal representing a second smoothed image in which noise components of said second image have been reduced, and b) generating a new first image signal by subtracting said second smoothed image signal from an original image signal, said new first image signal representing a new first image primarily composed of the patterns of said first tissues of said object.

An image having better image quality can be obtained by repeating the second and third processes in the aforesaid second method for forming an energy subtraction image. Specifically, the applicant further proposed a third method for forming an energy subtraction image, which comprises the steps of, after the processes in the aforesaid second method for forming an energy subtraction image have been carried out, repeating the following once or several times:

i) a new second process for generating a new second image signal by carrying out said second process in which said new first image signal obtained from said third process is taken as said first image signal in said second process, said new second image signal generated by said new second process representing a new second image primarily composed of the patterns of said second tissues of said object, and ii) a new third process for generating a new first image signal by carrying out said third process in which said new second image signal is taken as said second image signal in said third process, said new first image signal generated by said new third process representing a new first image primarily composed of the patterns of said first tissues of said object.

By applying the aforesaid second or third method for forming an energy subtraction image, a new second image signal can be generated ultimately which represents a new second image primarily composed of the patterns of the second tissues of the object. Specifically, the applicant still further proposed a fourth method for forming an energy subtraction image, which comprises the steps of:

after the processes in the aforesaid second or third method for forming an energy subtraction image have been carried out, generating a new second image signal by carrying out said second process or said new second process in which said new first image signal obtained from said third process or said new third process is taken as said first image signal in said second process or said new second process, said new second image signal thus most recently generated representing a new second image primarily composed of the patterns of said second tissues of said object.

Each of the aforesaid second to fourth methods for forming an energy subtraction image includes steps similar to those of the aforesaid first method for forming an energy subtraction image. Therefore, as described above with reference to the first method for forming an energy subtraction image, the second to fourth methods for forming an energy subtraction image embrace various, substantially identical embodiments. Also, other steps, such as noise reducing processes, may be carried out before or after the aforesaid first to fourth methods for forming an energy subtraction image.

The terms "first image" and "second image" (or the terms "new first image" and "new second image") as used herein for the aforesaid first to fourth methods for forming an energy subtraction image mean two images, which have been obtained from energy subtraction processing and in which the patterns of different tissues of a single object have been emphasized or only such patterns are illustrated. The first image and the second image (or the new first image and the new second image) are not limited to specific images. For example, the first image and the second image (or the new first image and the new second image) may be a soft tissue image and a bone image. Alternatively, in cases where the object is a mamma of a human body, the first image and the second image (or the new first image and the new second image) may be an image, in which the patterns of mammary glands have been emphasized, and an image, in which the pattern of a malignant tumor has been emphasized.

The aforesaid first to fourth methods for forming an energy subtraction image are based on the findings that, because an image signal representing a subtraction image is obtained by subtracting the image signals representing the original images from each other, the image signal representing the subtraction image has a lower S/N ratio than the image signals representing the original images.

Specifically, with the aforesaid first method for forming an energy subtraction image, the first image signal, which represents a first image primarily composed of patterns of first tissues of the object, is generated by carrying out a subtraction process on a plurality of original image signals. The first smoothed image signal is then generated by processing the first image signal. The first smoothed image signal represents a first smoothed image in which noise components of the first image have been reduced or eliminated. Thereafter, the first smoothed image signal is subtracted from an original image signal, and the second image signal is thereby generated which represents a second image primarily composed of patterns of second tissues of the object. Therefore, a second image can be obtained in which noise has been reduced to approximately the same level as that in the original images and which has good image quality and can serve as an effective tool in, particularly, the efficient and accurate diagnosis of an illness.

In order for the second image having good image quality to be obtained, it is necessary that, in the course of generating the first smoothed image signal representing the first smoothed image, the signal components of the first image signal representing the patterns of the first tissues of the object can be kept uneliminated, and only the noise components of the first image signal can be eliminated. However, part of the spatial frequency components corresponding to the patterns of the first tissues and part of the spatial frequency components corresponding to the noise components are identical with each other. Therefore, even if a non-linear filter is utilized which eliminates as many noise components as possible, the noise components and the signal components of the first image signal representing the patterns of the first tissues of the object cannot be completely separated from each other.

Accordingly, with the aforesaid second to fourth methods for forming an energy subtraction image, instead of aiming at completely eliminating the noise components only with a single noise reducing process, a plurality of noise reducing processes are carried out sequentially such that an image can be obtained in which noise has been reduced and which has good image quality and can serve as an effective tool in, particularly, the efficient and accurate diagnosis of an illness.

Specifically, with the aforesaid second method for forming an energy subtraction image, a noise reducing process is carried out on the first image signal in order to generate the first smoothed image signal representing a first smoothed image in which noise components of the first image have been reduced. The second image signal is then generated by subtracting the first smoothed image signal from an original image signal. Thereafter, a noise reducing process is carried out on the second image signal in order to generate the second smoothed image signal representing a second smoothed image in which noise components of the second image have been reduced. The new first image signal is then generated by subtracting the second smoothed image signal from an original image signal. With the two noise reducing processes, noise components can be reduced in appropriate manners. Therefore, an image can be obtained which contains less noise and which has better image quality and can serve as a more effective tool in, particularly, the efficient and accurate diagnosis of an illness, than the aforesaid first method for forming an energy subtraction image.

With the aforesaid third method for forming an energy subtraction image, the steps of the aforesaid second method for forming an energy subtraction image are carried out repeatedly such that more noise components can be reduced. The respective noise reducing processes can be allotted with appropriate modes of processing. Therefore, an image can be obtained in which noise components have been reduced even further.

With the aforesaid fourth method for forming an energy subtraction image, after the steps of the aforesaid second or third method for forming an energy subtraction image have been carried out, a noise reducing process is carried out on the new first image signal, which has been generated by the second or third method for forming an energy subtraction image. In this manner, a new first smoothed image signal is generated. Thereafter, the new first smoothed image signal is subtracted from an original image signal. Accordingly, the new second image can be obtained in which noise components have been reduced.

Each of the aforesaid methods for forming an energy subtraction image will hereinbelow be referred to as a method for forming a graininess-improved energy subtraction image. Also, the energy subtraction processing employed in each of the aforesaid methods for forming an energy subtraction image will hereinbelow be referred to as graininess improving energy subtraction processing.

When the graininess improving energy subtraction processing is carried out with each of the aforesaid methods for forming an energy subtraction image, by way of example, first and second recording media, such as sheets of X-ray film or stimulable phosphor sheets, are utilized. In such cases, in order to separate radiation having a high energy level and radiation having a low energy level from each other, a filter for filtering out radiation having a low energy level is located between the first and second recording media. Radiation is then irradiated to an object, and the radiation, which has passed through the object, impinges upon the combination of the first recording medium, the filter, and the second recording medium, from the side of the first recording medium. At this time, after the radiation has passed through the first recording medium, the radiation having a low energy level is filtered out by the filter, and only the radiation having a high energy level impinges upon the second recording medium. In many cases, a filter constituted of a metal, such as a copper plate, is utilized as the filter for filtering out radiation having a low energy level. Alternatively, a stimulable phosphor sheet may be utilized as the filter for filtering out radiation having a low energy level. Specifically, a stimulable phosphor sheet has the effects of filtering out radiation having a low energy level. Therefore, a stimulable phosphor sheet can be utilized in lieu of the filter for filtering out radiation having a low energy level.

In such cases, the stimulable phosphor sheet, which is located as the filter between the two recording media, can store image information of an object thereon. Therefore, it is considered that, when the image information stored on the stimulable phosphor sheet employed as the filter is utilized, the graininess of the energy subtraction image can be improved even further.

SUMMARY OF THE INVENTION

The primary object of the present invention is to provide a method for forming an energy subtraction image, in which a stimulable phosphor sheet is utilized as a filter for filtering out radiation having a low energy level and with which an energy subtraction image having improved graininess is obtained by the utilization of image information having been stored on the stimulable phosphor sheet utilized as the filter for filtering out radiation having a low energy level.

The present invention provides a method for forming an energy subtraction image in graininess improving energy subtraction processing wherein a stimulable phosphor sheet is utilized as a filter for filtering out radiation having a low energy level, radiation images are recorded on two recording media, which are located with the filter intervening therebetween, and image signals representing the radiation images are then detected from the two recording media and subtracted from each other, whereby an image signal representing an energy subtraction image is obtained. The method for forming an energy subtraction image in accordance with the present invention is characterized by adding high frequency components of an image signal, which represents image information stored on the stimulable phosphor sheet, to the image signal representing the energy subtraction image, and thereby obtaining an image signal representing an energy subtraction image, the graininess of which has been improved even further.

Specifically, the present invention provides, in energy subtraction processing in which:

i) a filter for filtering out radiation having a low energy level is located between a first recording medium and a second recording medium in order to separate radiation having a high energy level and radiation having a low energy level from each other, ii) radiation, which has passed through an object, is then irradiated to the combination of the first recording medium, the filter, and the second recording medium, from the side of the first recording medium such that only the radiation having a high energy level may impinge upon the second recording medium, radiation images of the object being thereby recorded on the first recording medium and the second recording medium, iii) the radiation images of the object are read out from the first recording medium and the second recording medium, image signals representing the radiation images of the object being thereby obtained, and iv) the image signals representing the radiation images of the object are subtracted from each other, an image signal representing an energy subtraction image being thereby obtained, wherein the subtraction process is not carried out on high frequency components of the image signals representing the radiation images of the object and is carried out only on low frequency components of the image signals representing the radiation images of the object such that an image signal representing an energy subtraction image having improved graininess may be obtained, a method for forming an energy subtraction image comprising the steps of:

a) utilizing a stimulable phosphor sheet as said filter for filtering out radiation having a low energy level, and b) adding high frequency components of an image signal, which represents image information stored on said stimulable phosphor sheet, to said image signal representing said energy subtraction image, whereby an image signal representing an energy subtraction image, the graininess of which has been improved even further, is obtained.

In the method for forming an energy subtraction image in accordance with the present invention, when the high frequency components of said image signal, which represents the image information stored on said stimulable phosphor sheet, are added to said image signal representing said energy subtraction image, said image signal representing said energy subtraction image may be passed through a frequency filter for reducing a high frequency, and said image signal, which represents the image information stored on said stimulable phosphor sheet, may be passed through a high frequency pass filter. Thereafter, the image signal, which has passed through the frequency filter for reducing a high frequency, and the image signal, which has passed through the high frequency pass filter, may be added to each other.

Also, in the method for forming an energy subtraction image in accordance with the present invention, the sum of responses of the two filters should preferably be equal to 1 over the whole frequency range. In such cases, the modulation transfer function of the energy subtraction image can be kept the same.

The method for forming an energy subtraction image in accordance with the present invention is used in graininess improving energy subtraction processing wherein the subtraction process is not carried out on high frequency components of the image signals representing the radiation images of the object and is carried out only on low frequency components of the image signals representing the radiation images of the object such that an image signal representing an energy subtraction image having improved graininess may be obtained. With the method for forming an energy subtraction image in accordance with the present invention, a stimulable phosphor sheet is utilized as the filter for filtering out radiation having a low energy level. Also, high frequency components of an image signal, which represents image information stored on the stimulable phosphor sheet employed as the filter, are added to the image signal representing the energy subtraction image. Therefore, an image signal representing an energy subtraction image, the graininess of which has been improved even further, can be obtained.

DESCRIPTION OF THE PREFERRED EMBODIMENTS

The present invention will hereinbelow be described in further detail with reference to the accompanying drawings.

Figure 1:
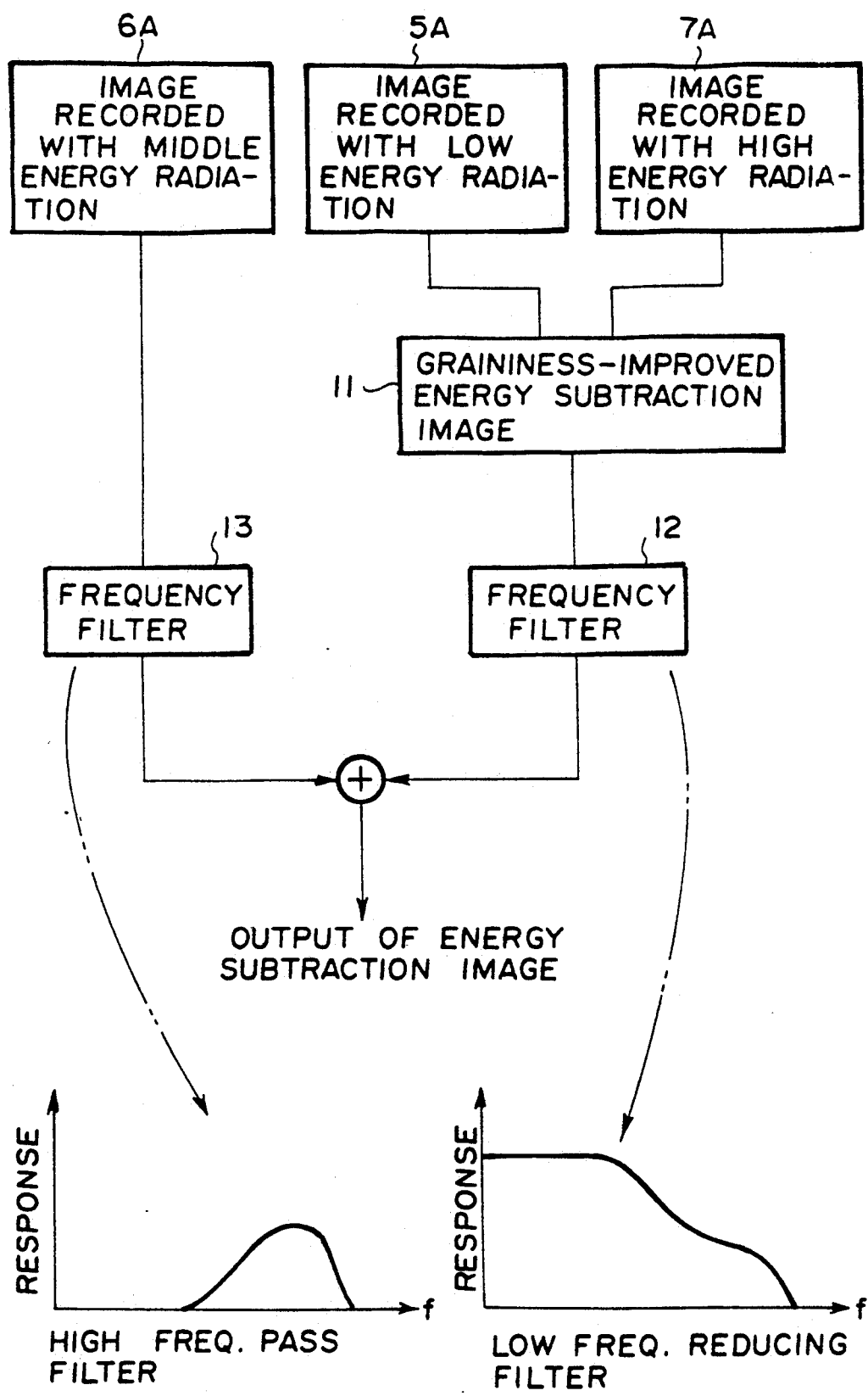
FIG. 1 is a block diagram showing processes in the method for forming an energy subtraction image in accordance with the present invention.

FIG. 1 is a block diagram showing basic processes in the method for forming an energy subtraction image in accordance with the present invention.

With reference to FIG. 1, an image signal representing an energy subtracting image 11 is obtained from graininess improving energy subtraction processing. Specifically, as will be described later with reference to FIG. 10, radiation images (i.e., a radiation image 5A recorded with radiation having a low energy level and a radiation image 7A recorded with radiation having a high energy level) have been recorded on recording media 5 and 7, which are located with a stimulable phosphor sheet 6 intervening therebetween. The stimulable phosphor sheet 6 serves as a filter for filtering out radiation having a low energy level. Image signals (i.e., an image signal representing the radiation image, which has been recorded with the radiation having a low energy level, and an image signal representing the radiation image, which has been recorded with the radiation having a high energy level) are then detected from the radiation image 5A, which has been recorded with the radiation having a low energy level, and the radiation image 7A, which has been recorded with the radiation having a high energy level. The image signal representing the radiation image 5A, which has been recorded with the radiation having a low energy level, and the image signal representing the radiation image 7A, which has been recorded with the radiation having a high energy level, are then subtracted from each other. From the subtraction process, an image signal representing the graininess-improved energy subtraction image 11 is obtained. With the method for forming an energy subtraction image in accordance with the present invention, during the graininess improving energy subtraction processing, high frequency components of an image signal representing a radiation image, which has been stored on the stimulable phosphor sheet 6 (i.e. a radiation image recorded with the radiation having a middle energy level), are added to the image signal representing the graininess-improved energy subtraction image 11. In this manner, an image signal representing an energy subtraction image, the graininess of which has been improved even further, is obtained.

Figure 10:
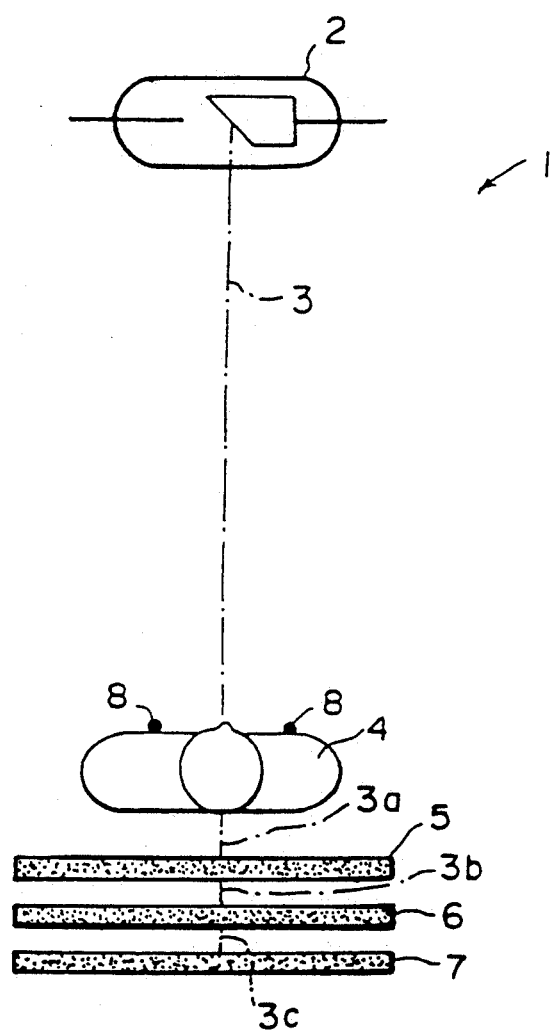
FIG. 10 is a schematic view showing an X-ray image recording apparatus, and FIG. 11 a perspective view showing an X-ray image read-out apparatus and an image processing and displaying apparatus for carrying out a method for forming a graininess-improved energy subtraction image, in which the method for forming an energy subtraction image in accordance with the present invention may be employed.

Specifically, as illustrated in FIG. 10, during energy subtraction processing, the filter 6 for filtering out radiation having a low energy level is located between the first recording medium 5 and the second recording medium 7 in order to separate radiation having a high energy level and radiation having a low energy level from each other. Radiation 3 is produced by a radiation source 2. Radiation 3a, which has passed through an object 4, is then irradiated to the combination of the first recording medium 5, the filter 6, and the second recording medium 7, from the side of the first recording medium 5 such that only the radiation having a high energy level may -impinge- upon the second recording medium 7. In this manner, radiation images of the object 4 are recorded on the first recording medium 5 and the second recording medium 7. The radiation images of the object 4 are read out from the first recording medium 5 and the second recording medium 7, and image signals representing the radiation images of the object 4 are thereby obtained. Thereafter, the image signals representing the radiation images of the object 4 are subtracted from each other, an image signal representing an energy subtraction image is thereby obtained. During such energy subtraction processing, graininess improving energy subtraction processing is carried out wherein the subtraction process is not carried out on high frequency components of the image signals representing the radiation images of the object 4 and is carried out only on low frequency components of the image signals representing the radiation images of the object 4 such that an image signal representing an energy subtraction image having improved graininess may be obtained. With the method for forming an energy subtraction image in accordance with the present invention, in such graininess improving energy subtraction processing, a stimulable phosphor sheet is utilized as the filter 6 for filtering out radiation having a low energy level. Also, high frequency components of an image signal, which represents the radiation image 6A stored on the stimulable phosphor sheet 6 (i.e, which represents the radiation image recorded with the radiation having a middle energy level), are added to the image signal representing the energy subtraction image. In this manner, an image signal representing an energy subtraction image, the graininess of which has been improved even further, is obtained.

As illustrated in FIG. 1, when the high frequency components of the image signal, which represents the radiation image 6A stored on the stimulable phosphor sheet 6 (i.e, which represents the radiation image recorded with the radiation having a middle energy level), are added to the image signal representing the energy subtraction image, the image signal representing the energy subtraction image 11, which has been obtained from the energy subtraction processing, may be passed through a high frequency reducing filter 12. Also, the image signal, which represents the radiation image 6A stored on the stimulable phosphor sheet 6, may be passed through a high frequency pass filter 13. The image signals, which have passed through the filter 12 and the filter 13 may then be added to each other.

As illustrated at the lower part in FIG. 1, the sum of responses of the two filters 12 and 13 should preferably be equal to 1 over the whole frequency range. In such cases, the modulation transfer function of the energy subtraction image can be kept the same.

Examples of how the graininess improving energy subtraction processing, in which the method for forming an energy subtraction image in accordance with the present invention may be employed, is carried out will hereinbelow be described in detail. In the examples described below, stimulable phosphor sheets are utilized as the recording media.

FIG. 10 is a schematic view showing an X-ray image recording apparatus 1.

With reference to FIG. 10, X-rays 3 are produced by an X-ray tube 2 of the X-ray image recording apparatus 1 and irradiated to an object 4 (in this example, the chest of a human body). X-rays 3a, which have passed through the object 4, impinge upon a first stimulable phosphor sheet 5, and energy from the comparatively low energy components of the X-rays 3a is stored on the first stimulable phosphor sheet 5. In this manner, an X-ray image of the object 4 is stored on the first stimulable phosphor sheet 5. X-rays 3b, which have passed through the first stimulable phosphor sheet 5, then pass through a filter 6 for filtering out the low energy components of the X-rays. X-rays 3c, which have passed through the filter 6 and are composed of the high energy components, impinge upon a second stimulable phosphor sheet 7. In this manner, an X-ray image of the object 4 is stored on the second stimulable phosphor sheet 7. During the image recording operation, marks 8, 8 are placed on the object 4. The images of the marks 8, 8 are utilized in the course of adjusting the positions of the two X-ray images so that the two X-ray images coincide with each other.

In the X-ray image recording apparatus 1, the X-ray images are stored on the first stimulable phosphor sheet 5 and the second stimulable phosphor sheet 7 with a single recording operation. Alternatively, the two X-ray images may be recorded one after the other with two independent recording operations.

Figure 11:
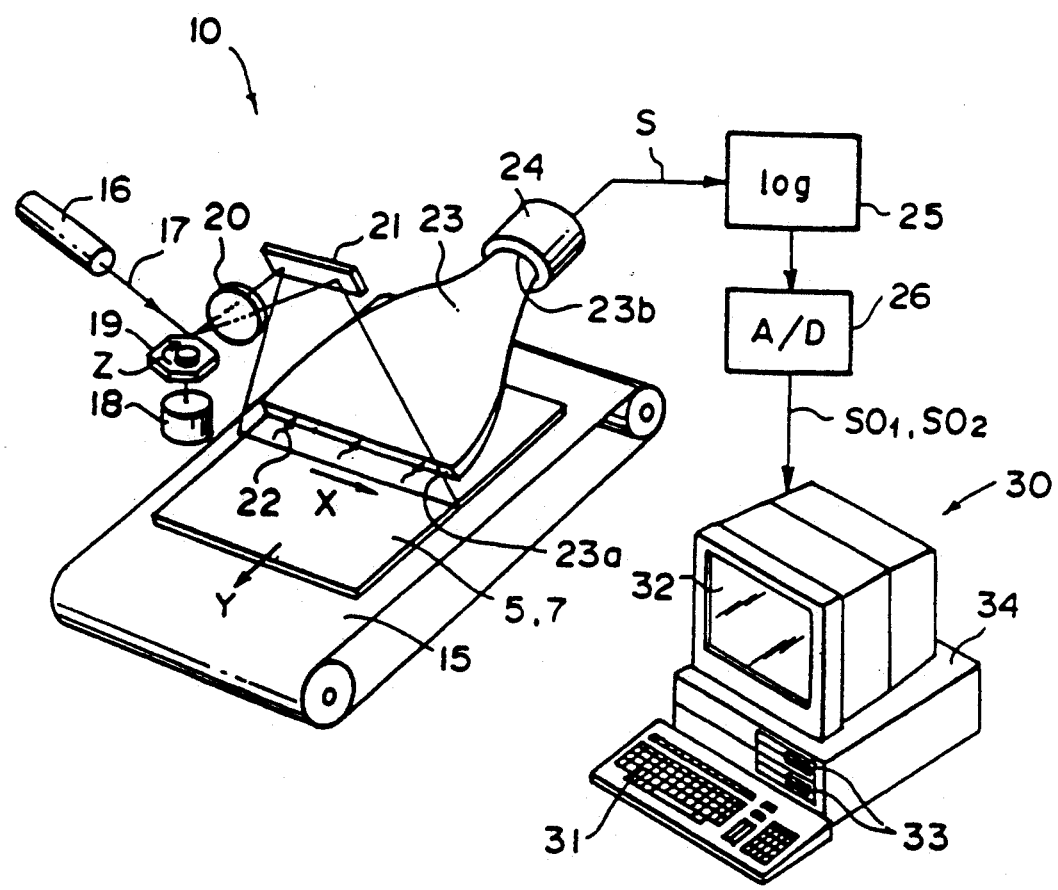

FIG. 11 is a perspective view showing an X-ray image read-out apparatus 10 and an image processing and displaying apparatus 30 for carrying out a method for forming a graininess-improved energy subtraction image, in which the method for forming an energy subtraction image in accordance with the present invention may be employed.

After the first X-ray image and the second X-ray image have been stored respectively on the first stimulable phosphor sheet 5 and the second stimulable phosphor sheet 7 in the X-ray image recording apparatus 1 shown in FIG. 10, the first stimulable phosphor sheet 5 and the second stimulable phosphor sheet 7 are placed one after the other at a predetermined position in the X-ray image read-out apparatus 10 shown in FIG. 11. How the first X-ray image is read out from the first stimulable phosphor sheet 5 will be described hereinbelow.

With reference to FIG. 11, the first stimulable phosphor sheet 5 is conveyed in a sub-scanning direction indicated by the arrow Y by a sheet conveyance means 15, which is constituted of an endless belt, or the like, and which is operated by an operating means (not shown). A laser beam 17, which serves as stimulating rays, is produced by a laser beam source 16. The laser beam 17 is reflected and deflected by a rotating polygon mirror 19, which is being quickly rotated by a motor 18 in the direction indicated by the arrow Z. The laser beam 17 then passes through a converging lens 20, which is constituted of an fθ lens or the like. The direction of the optical path of the laser beam 17 is then changed by a mirror 21, and the laser beam 17 is caused to impinge upon the first stimulable phosphor sheet 5 and scan it in a main scanning direction indicated by the arrow X. The main scanning direction is approximately normal to the sub-scanning direction indicated by the arrow Y. When the first stimulable phosphor sheet 5 is exposed to the laser beam 17, the exposed portion of the first stimulable phosphor sheet 5 emits light 22 in an amount proportional to the amount of energy stored thereon during its exposure to the X-rays. The emitted light 22 is guided by a light guide member 23, and photoelectrically detected by a photomultiplier 24. The light guide member 23 is made from a light guiding material, such as an acrylic plate. The light guide member 23 has a linear light input face 23a, positioned to extend along the main scanning line on the first stimulable phosphor sheet 5, and a ring-shaped light output face 23b, positioned so that it is in close contact with a light receiving face of the photomultiplier 24. The emitted light 22, which has entered the light guide member 23 from its light input face 23a, is guided through repeated total reflection inside of the light guide member 23, emanates from the light output face 23b, and is received by the photomultiplier 24. In this manner, the amount of the emitted light 22, which amount represents the first X-ray image stored on the first stimulable phosphor sheet 5, is converted into an electric signal by the photomultiplier 24.

An analog signal S generated by the photomultiplier 24 is logarithmically amplified by a logarithmic amplifier 25, and fed into an A/D converter 26. The A/D converter 26 samples the analog signal S, and the sampled signal is converted into a digital image signal SO. The image signal SO thus obtained represents the first X-ray image, which was stored on the first stimulable phosphor sheet 5, and will hereafter be referred to as the first image signal SO1. The first image signal SO1 is stored in an internal memory of the image processing and displaying apparatus 30.

The image processing and displaying apparatus 30 is provided with a keyboard 31, from which various instructions are entered, and a CRT display device 32, which displays auxiliary information for instructions and a visible image represented by an image signal. The image processing and displaying apparatus 30 is also provided with a floppy disk drive unit 33, which receives and operates a floppy disk serving as an auxiliary storage medium, and a main body 34 which incorporates a CPU and the internal memory.

Thereafter, in the same manner as that described above, a second image signal SO2 is obtained which represents the second X-ray image stored on the second stimulable phosphor sheet 7. The second image signal SO2 is stored in the internal memory of the image processing and displaying apparatus 30.

Figure 2:
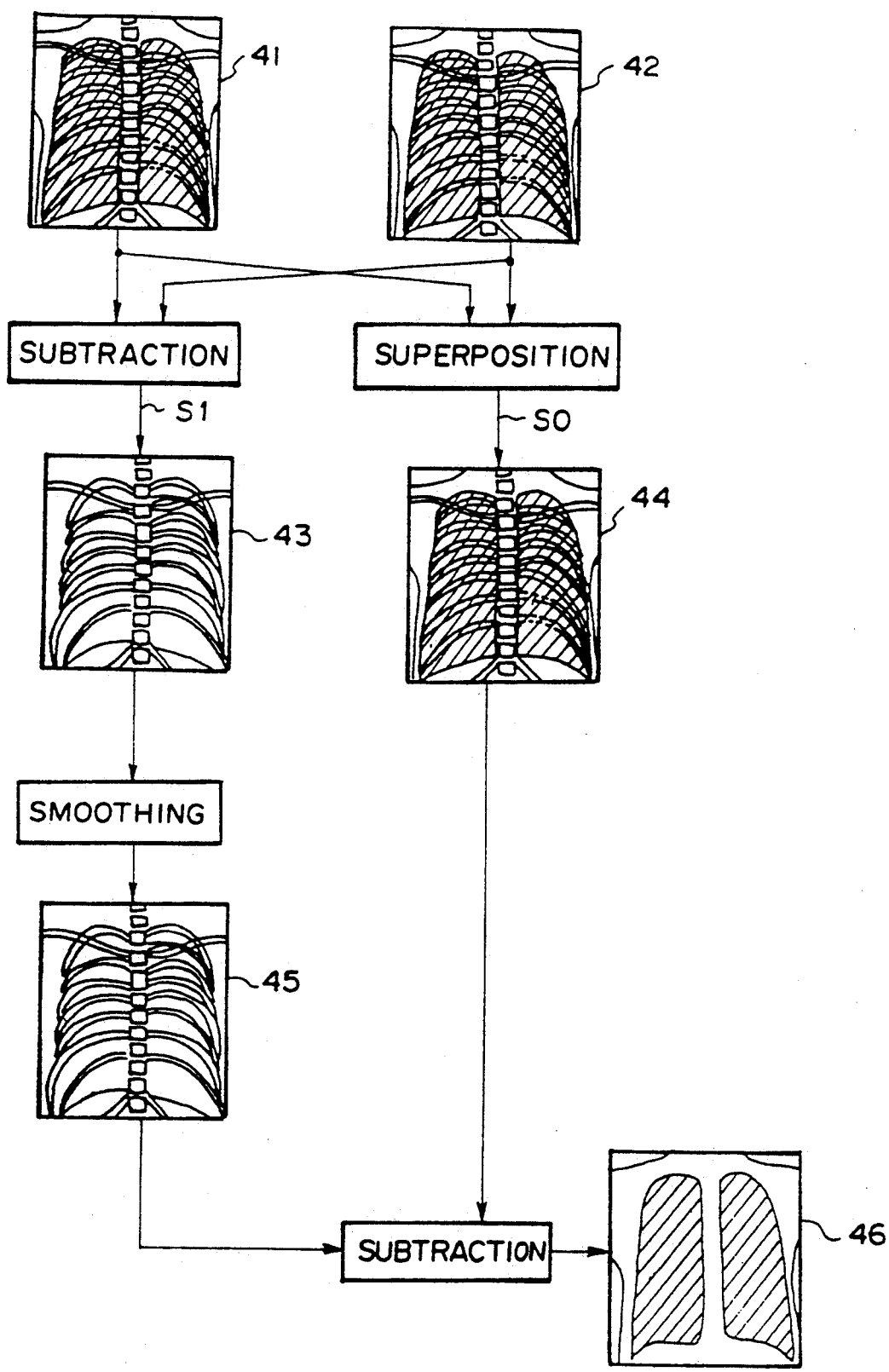
FIG. 2 is a flow chart showing the processes, which are carried out in an image processing and displaying apparatus.

FIG. 2 is a flow chart showing the processes, which are carried out in the image processing and displaying apparatus 30. The processes are carried out on the first image signal SO1 representing the first X-ray image and the second image signal SO2 representing the second X-ray image, which signals are stored in the internal memory of the image processing and displaying apparatus 30.

The first image signal SO1 and the second image signal SO2, which are stored in the internal memory of the image processing and displaying apparatus 30, represent a first X-ray image 41 and a second X-ray image 42 shown in FIG. 2. The first X-ray image 41 has been recorded with the comparatively low energy components of the X-rays. The second X-ray image 42 has been recorded with the comparatively high energy components of the X-rays. Both of the first X-ray image 41 and the second X-ray image 42 are original images composed of patterns of soft tissues and bones. The levels of image density of the soft tissue patterns and the bone patterns are different between the first X-ray image 41 and the second X-ray image 42.

The first image signal SO1 and the second image signal SO2 are read from the internal memory of the image processing and displaying apparatus 30 shown in FIG. 11. Position adjustment processing is then carried out on the first image signal SO1 and the second image signal SO2 such that the positions of the first X-ray image 41 represented by the first image signal SO1 and the second X-ray image 42 represented by the second image signal SO2 may coincide with each other. For this purpose, a method disclosed in, for example, U.S. Pat. No. 4,710,875 may be employed. With the position adjustment processing, one of the two X-ray images is linearly moved or rotated with respect to the other X-ray image until the images of the marks 8, 8 in one X-ray image, which marks are shown in FIG. 10, overlap the images of the marks 8, 8 in the other X-ray image.

Thereafter, a subtraction process is carried out on the first image signal SO1 and the second image signal SO2.

Specifically, X-ray absorption coefficients are classified into the following:

$\mu LT$: Absorption coefficient of soft tissues with respect to the low energy components of X-rays.

$\mu HT$: Absorption coefficient of soft tissues with respect to the high energy components of X-rays.

$\mu LB$: Absorption coefficient of bones with respect to the low energy components of X-rays.

$\mu HB$: Absorption coefficient of bones with respect to the high energy components of X-rays.

The first image signal SO1 and the second image signal SO2 are weighted, and the image signal components of the weighted image signals are subtracted from each other which represent the image information stored at corresponding picture elements in the two X-ray images. Thus a bone image signal S1 is obtained, which can be expressed as $$S1 = SO_1 - \frac{\mu L^T}{\mu H^T} SO_2 + C \qquad (1)$$

where C denotes a bias component. The bone image signal S1 represents a bone image 43 shown in FIG. 2, which image is composed of the bone patterns.

The first image signal SO1 and the second image signal SO2 may be weighted in a different way, and the image signal components of the weighted image signals may be subtracted from each other which represent the image information stored at corresponding picture elements in the two X-ray images. Thus a soft tissue image signal S2 can be obtained, which is expressed as $$S2 = \frac{\mu L^B}{\mu H^B} SO_2 - SO_1 + C' \qquad (2)$$

where C' denotes a bias component. The soft tissue image signal S2 represents a soft tissue image composed of the soft tissue patterns. However, in this example, the operations for generating the soft tissue image signal S2 need not be carried out.

Also, the image signal components of the first image signal SO1 and the second image signal SO2 are added to each other which represent the image information stored at corresponding picture elements in the two X-ray images. Thus a superposition image signal SO is obtained, which can be expressed as $$SO = (So1 + SO2)/2 \qquad (3)$$

The superposition image signal SO represents a superposition image 44 shown in FIG. 2, which results from the superposition of the first X-ray image 41 and the second X-ray image 42 upon each other. The superposition image 44 can be referred to as an original image composed of the soft tissue patterns and the bone patterns. The first X-ray image 41 or the second X-ray image 42 may be utilized in lieu of the superposition image 44. However, the superposition image 44 should preferably be utilized. This is because the superposition image 44, which is obtained from the superposition of the first X-ray image 41 and the second X-ray image 42 upon each other, includes less noise components than the first X-ray image 41 and the second X-ray image 42, and therefore is advantageous for the subsequent processes.

Thereafter, the bone image signal S1 is processed such that noise components contained in the bone image 43 may be eliminated.

Figure 3:
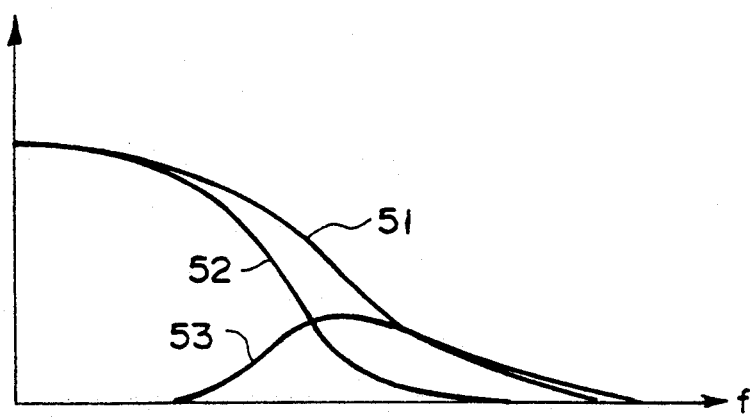
FIG. 3 is a graph showing spatial frequency spectra of a bone image and an image obtained by processing the bone image signal representing the bone image.

FIG. 3 is a graph showing spectra of a bone image and an image, which is obtained by processing the bone image signal representing the bone image, with respect to the spatial frequency, f.

In FIG. 3, curve 51 indicates the spectrum of the bone image 43, and curve 53 indicates the spectrum of noise components included in the bone image 43.

First, a smoothing process is carried out on the bone image signal S1. As the smoothing process, one of various processes may be employed. For example, a simple averaging process may be employed wherein the mean value of the values of the image signal components of an image signal, which represent the picture elements belonging to a predetermined region having a predetermined picture element in the middle, is calculated and employed as the value of the image signal component representing the predetermined picture element. Alternatively, a median filter process may be employed wherein the median value of the values of the image signal components of an image signal, which represent the picture elements belonging to a predetermined region having a predetermined picture element in the middle, is calculated and employed as the value of the image signal component representing the predetermined picture element. As another alternative, an edge keeping filter (V-filter) process may be employed wherein a predetermined region having a predetermined picture element in the middle is divided into a plurality of small regions, and the variance of the values of the image signal components corresponding to each small region is calculated. A small region associated with the smallest variance is then found, and the mean value of the values of the image signal components corresponding to the small region associated with the smallest variance is employed as the value of the image signal component representing the predetermined picture element. As a further alternative, a process may be employed wherein Fourier transformation is carried out on an image signal, the signal obtained from the Fourier transformation is subjected to an operation for removing high spatial frequency components corresponding to noise components, and thereafter inverse Fourier transformation is carried out.

However, the simple averaging process has the drawbacks in that edges in the image become unsharp. The median filter process has the drawbacks in that, because picture elements are interchanged, contour line-like artifacts often occur. The edge keeping filter process has the drawbacks in that honeycomb-like artifacts often occur. The Fourier transformation process has the drawbacks in that a long time is taken for operations to be carried out.

Therefore, in this example, as will be described below, a smoothing process is carried out in which a filter adaptive to a probability density function is utilized. With the smoothing process, noise can be eliminated such that edges (i.e. step-like changes in density, which define boundaries among patterns of a plurality of different tissues of an object), which it is necessary to reproduce, may be kept sharp and no artifact may occur in the smoothed image. Also, noise can be eliminated quickly with simple operations.

Specifically, first, each of the picture elements in the bone image 43 is taken as a predetermined picture element, and the probability density function of the image signal components of the bone image signal S1 is generated, which represent a plurality of the picture elements belonging to a predetermined region having the predetermined picture element in the middle.

Figure 4A:
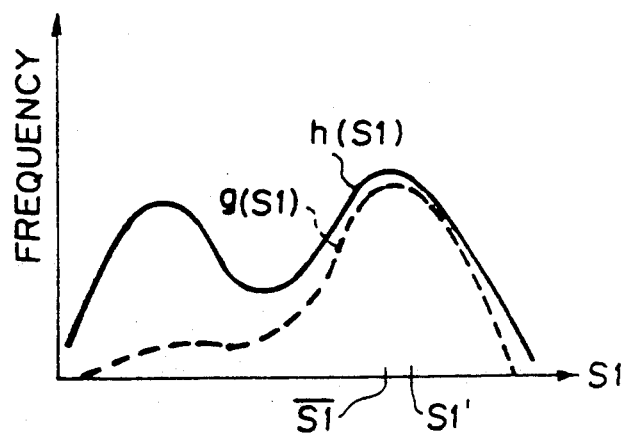
FIGS. 4A and 4B are graphs showing examples of probability density functions of image signal components, which image signal components represent a plurality of picture elements belonging to a predetermined region having a predetermined picture element in the middle.
Figure 4B:
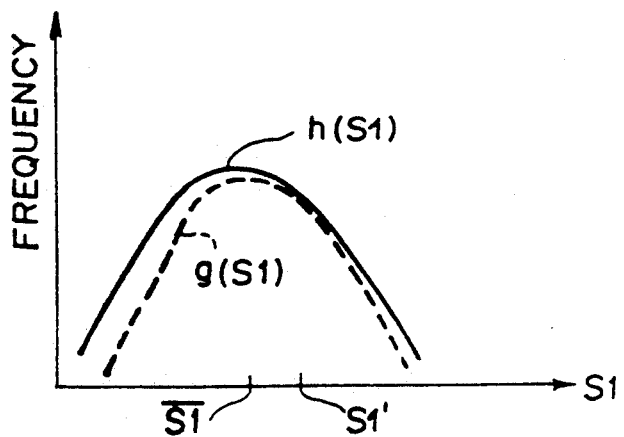
Figure 5:
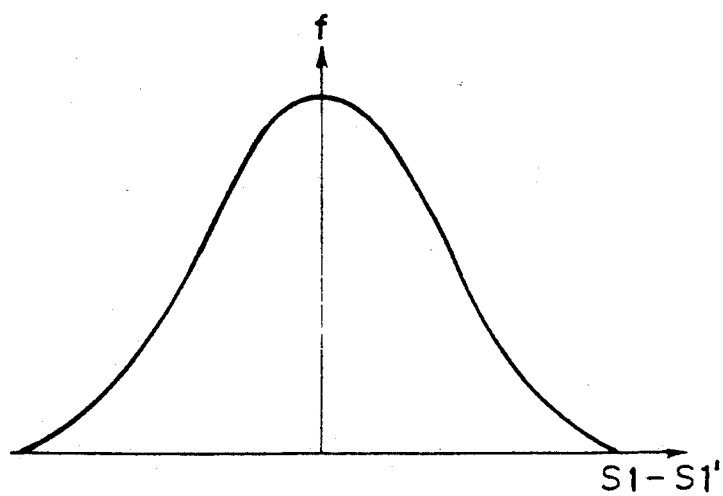
FIG. 5 is a graph showing an example of a function, in which the difference between the value of an image signal S1 and the value S1' of the image signal component representing a predetermined picture element located in the middle of a predetermined region serves as a variable.

FIGS. 4A and 4B are graphs showing examples of probability density functions of image signal components of the image signal S1, which image signal components represent a plurality of picture elements belonging to a predetermined region having a predetermined picture element in the middle. The image signal component representing the predetermined picture element has a value S1'. FIG. 5 is a graph showing an example of a function, in which the difference between the value of the image signal S1 and the value S1' of the image signal component representing the predetermined picture element located in the middle of the predetermined region serves as a variable.

The probability density functions shown in FIGS. 4A and 4B are denoted by h(S1). Also, a function, the value of which decreases monotonously as the absolute value |S1−S1'| increases, e.g. the function shown in FIG. 5, is denoted by f(S1−S1'). The values of a function g(S1) representing how frequently the values of image signal components of an image signal occur, which image signal has been processed, are calculated with the formula $$g(S1) = h(S1) \times f(S1 - S1') \quad (4)$$

In cases where the function h(S1) includes a plurality of projecting parts shown in FIG. 4A, the function g(S1) has the effects of extracting only of the projecting part, to which the image signal component having the value of S1' and representing the predetermined picture element belongs.

After the values of the function g(S1) have been calculated with Formula (4), the values of the image signal components of the image signal S1, which image signal components represent the picture elements belonging to the predetermined region, are weighted with the values of the function g(S1). A calculation is then made to find a mean-level value $\overline{S1}$ of the weighted values of the image signal components of the image signal S1. Specifically, by way of example, the moment of first order of the function g(S1) is calculated with the formula $$\overline{S1} = \int f(S1) \times S1 dS1 / \int S1 dS1 \quad (5)$$

The picture elements in the above image 43 are sequentially taken as the predetermined picture element, and the processes with Formulas (4) and (5) are carried out for all of the picture elements in the bone image 43. In this manner, a smoothed image signal e,ovs/S1/ is generated. (As an aid in facilitating the explanation, the same reference numeral is utilized to indicate both the value of the image signal component representing each picture element and the image signal representing the whole image.) As indicated by curve 52 in FIG. 3, the smoothed image signal $\overline{S1}$ is generated by primarily eliminating the high spatial frequency components from the bone image signal S1. As shown in FIG. 4A, as for a picture element located in the vicinity of an edge, the smoothed image signal S1 has the mean-level value of the values belonging only to the projecting part, to which said picture element belongs. Therefore, edges in the bone image 43 can be kept sharp.

Thereafter, the superposition image signal SO, which is expressed as Formula (3) and represents the superposition image 44, and the smoothed image signal $\overline{S1}$ are weighted. The image signal components of the weighted smoothed image signal $\overline{S1}$ are subtracted from the image signal components of the weighted superposition image signal SO, which image signal components represent the image information stored at corresponding picture elements in the two X-ray images. Thus a soft tissue image signal S2' is obtained, which can be expressed as $$S2' = SO - \frac{\left(1 + \frac{\mu L^B}{\mu H^B}\right)}{2 \cdot \left(\frac{\mu L^B}{\mu H^B} - \frac{\mu L^T}{\mu H^T}\right)} S1 + C'' \quad (6)$$

where C'' denotes a bias component. The soft tissue image signal S2' represents a processed soft tissue image 46 shown in FIG. 2. The processed soft tissue image 46 has approximately the same image information as the soft tissue image expressed as Formula (2) and includes less noise components than the soft tissue image expressed as Formula (2).

The soft tissue image signal S2', which has been generated with Formula (6), is fed into the CRT display device 32 of the image processing and displaying apparatus 30. A visible image is reproduced from the soft tissue image signal S2' and displayed on the CRT display device 32.

In the example described above, the soft tissue image signal S2 is generated by smoothing the bone image signal S1 and subtracting the smoothed signal from the original image signal representing the original image. In cases where a bone image is to be reproduced, the soft S2 is generated with Formula (2) and tissue image signal S2 is generated with Formula (2) and then smoothed. The smoothed signal is then subtracted from the original image signal representing the original image. In this manner, a bone image in which noise components have been reduced can be obtained.

Another example, which is substantially identical with the example shown in FIG. 2, will be described hereinbelow.

Figure 6:
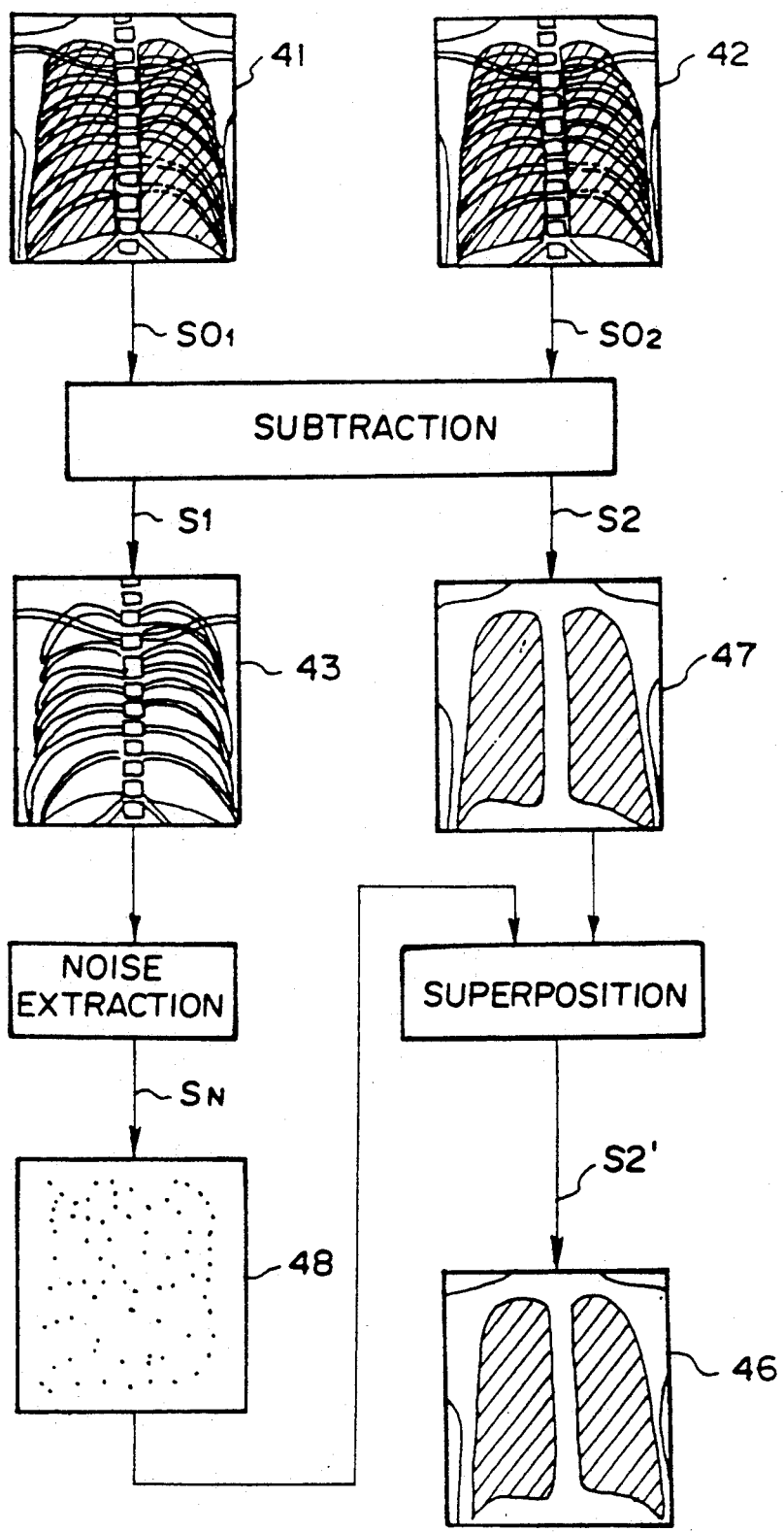
FIG. 6 is a flow chart showing the processes, which are substantially identical with those shown in FIG. 2 and are carried out in an image processing and displaying apparatus.

As an aid in explaining the substantially identical example, FIG. 6 shows how the image processing and displaying apparatus 30 carries out the processes on the first image signal SO1 representing the first X-ray image and the second image signal SO2 representing the second X-ray image, which signals are stored in the internal memory of the image processing and displaying apparatus 30. In FIG. 6, similar elements are numbered with the same reference numerals with respect to FIG. 2.

With reference to FIG. 6, the bone image signal S1 representing the bone image 43 and the soft tissue image signal S2 representing a soft tissue image 47 are generated by carrying out calculations with Formulas (1) and (2) from the first image signal SO1 representing the first X-ray image 41 and the second image signal SO2 representing the second X-ray image 42.

Thereafter, in the same manner as that in the example of FIG. 2, the smoothed image signal $\overline{S1}$ representing the smoothed bone image, in which the noise components included in the bone image 43 have been reduced, is generated by processing the bone image signal S1 in accordance with Formulas (4) and (5). The image signal components of the smoothed image signal $\overline{S1}$ are then subtracted from the image signal components of the bone image signal S1, which image signal components represent the image information stored at corresponding picture elements in the two X-ray images. Thus a noise signal SN representing a noise image 48, which is composed of only the noise components, is obtained. The noise signal SN can be expressed as $$S_N = S1 - \overline{S1} \tag{7}$$

As indicated by curve 53 in FIG. 3, the noise signal SN is composed of only the noise components included in the bone image 43. In the smoothed image signal $\overline{S1}$, even if the information representing the edges in the bone image 43 has a level of spatial frequency as high as that of the noise components, the information representing the edges will not be lost. Therefore, by carrying out the calculations with Formula (7) to find the difference between the bone image signal S1 and the smoothed image signal $\overline{S1}$, the noise signal SN can be obtained in which the information representing the edges has been completely canceled. Accordingly, the noise signal SN more accurately represents only the noise components of the bone image 43 than when a smoothing process was carried out such that the information representing the edges may be lost.

Thereafter, the noise signal SN and the soft tissue image signal S2 representing the soft tissue image 47 shown in FIG. 6 are weighted, and the image signal components of the weighted image signals are added to each other, which image signal components represent the image information stored at corresponding picture elements in the two images. Thus a soft tissue image signal S2' is obtained, which represents a processed soft tissue image 46 shown in FIG. 6. The processed soft tissue image 46 has approximately the same image information as the soft tissue image 47 and includes less noise components than the soft tissue image 47. In this embodiment, the calculations are carried out with the formula $$S2' = \left\{ \left(1 + \frac{\mu L^T}{\mu H^T}\right) S2 + \left(1 + \frac{\mu L^B}{\mu H^B}\right) S_N \right\} / 2 \cdot \left(\frac{\mu L^B}{\mu H^B} - \frac{\mu L^T}{\mu H^T}\right) \tag{8}$$

Therefore, the noise components can be reduced even further.

As described in detail in U.S. patent application Ser. No. 654,450, the example of FIG. 6 is substantially identical with the example of FIG. 2.

Figure 7:
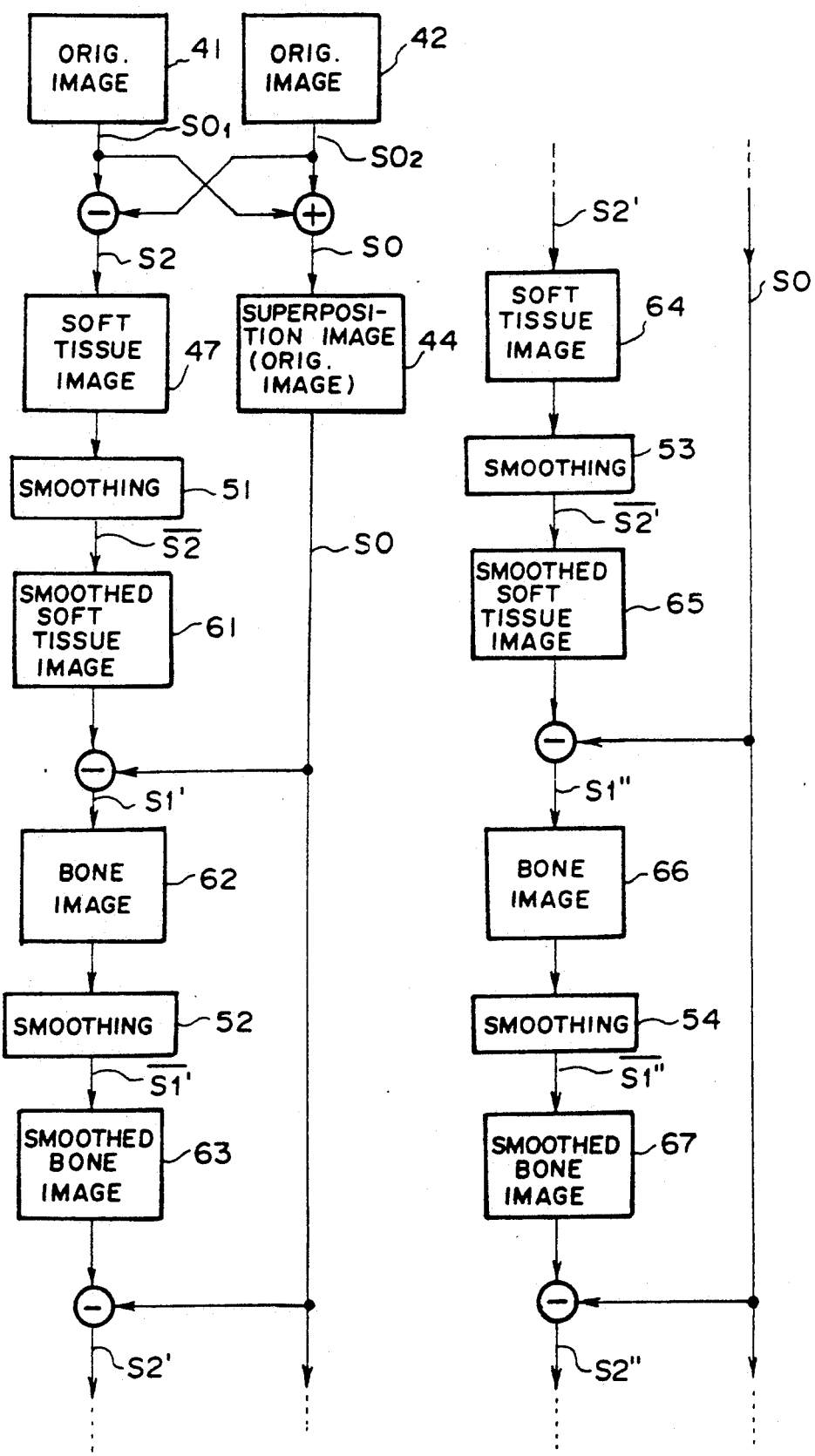
FIG. 7 is a flow chart showing the processes in a different example of graininess improving energy subtraction processing, in which the method for forming an energy subtraction image in accordance with the present invention may be employed.

FIG. 7 is a flow chart showing the processes in a further example of the graininess improving energy subtraction processing. FIGS. 8A through 8M are graphs showing the profiles of the images, which are shown in FIG. 7, along a predetermined direction. In FIG. 7, similar elements are numbered with the same reference numerals with respect to FIG. 2 or FIG. 6.

Figure 8:
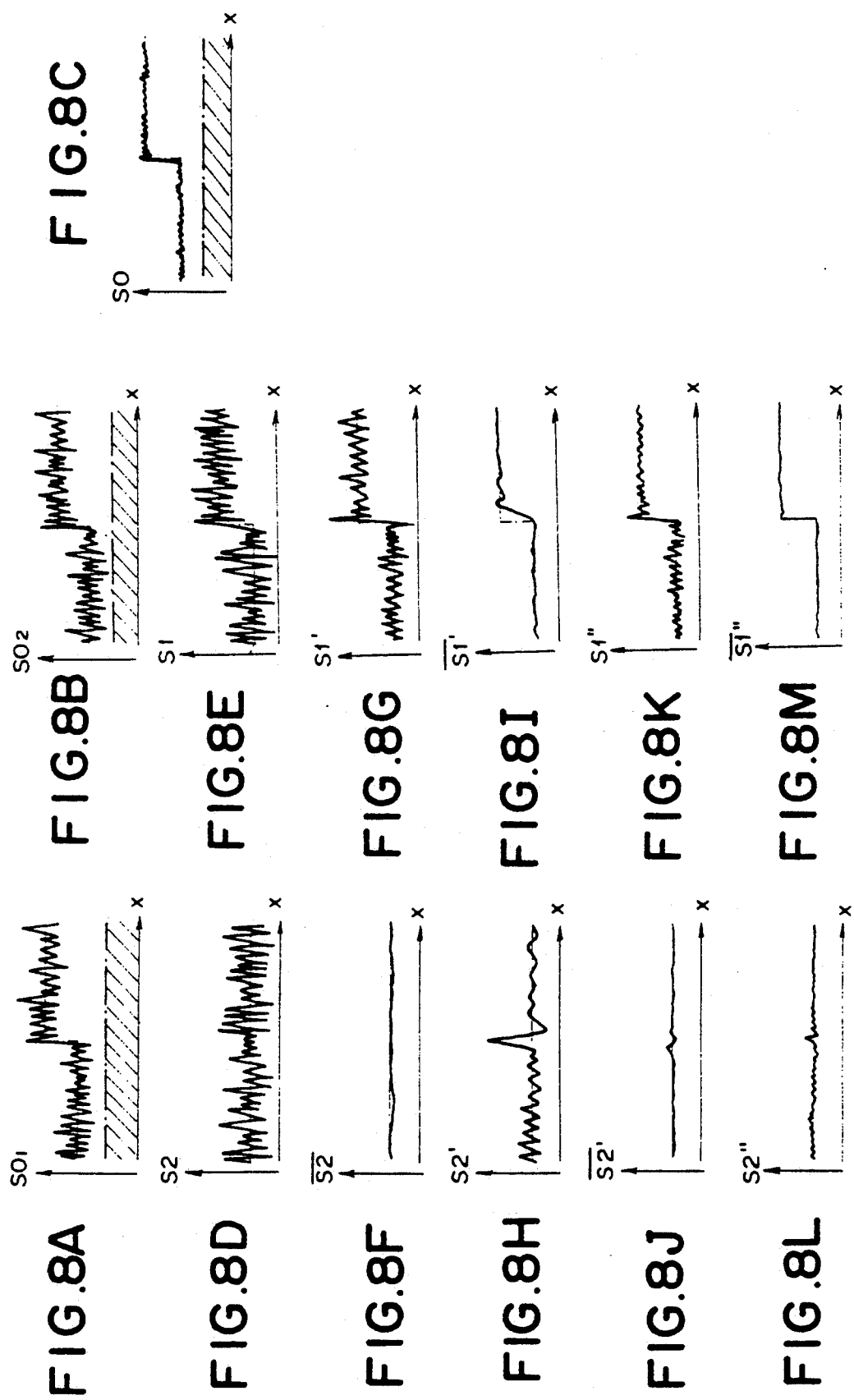
FIGS. 8A through 8M are graphs showing the profiles of the images, which are shown in FIG. 7, along a predetermined direction.

FIGS. 8A and 8B show the profiles of the first X-ray image 41 and the second X-ray image 42, which are original images. Specifically, FIG. 8A shows how the values of the image signal components of the first image signal SO1 representing the first X-ray image 41 are distributed, which image signal components represent the picture elements located along a predetermined direction (x direction) in the first X-ray image 41. FIG. 8B shows how the values of the image signal components of the second image signal SO2 representing the second X-ray image 42 are distributed, which image signal components represent the picture elements located along the predetermined direction (x direction) in the second X-ray image 42. The levels of the first image signal SO1 and the second image signal SO2 are different from each other. However, each of the first image signal SO1 and the second image signal SO2 is composed of the image signal components, which represent the soft tissue patterns (corresponding to the hatched region in FIG. 8A or FIG. 8B) and have approximately uniform values, the image signal components, which represent the bone patterns and have values changing step-wise, and the random noise components. These three types of image signal components are superposed one upon another.

By carrying out the weighting subtraction process (indicated by the symbol "—" in FIG. 7) with Formula (2) on the first image signal SO1 representing the first X-ray image 41 (original image) and the second image signal SO2 representing the second X-ray image 42 (original image), the soft tissue image signal S2 representing the soft tissue image 47 is generated. Also, by carrying out the addition process (indicated by the symbol "+" in FIG. 7) with Formula (3) on the first image signal SO1 and the second image signal SO2, the superposition image signal SO representing the superposition image 44 is generated.

FIG. 8C shows how the values of the image signal components of the superposition image signal SO are distributed. Like the first image signal SO1 shown in FIG. 8A and the second image signal SO2 shown in FIG. 8B, the superposition image signal SO is composed of the image signal components, which represent the soft tissue patterns (corresponding to the hatched region in FIG. 8C) and have approximately uniform values, the image signal components, which represent the bone patterns and have values changing step-wise, and the random noise components. These three types of image signal components are superposed one upon another. However, the superposition image signal SO includes less noise components than the first image signal SO1 shown in FIG. 8A and the second image signal SO2 shown in FIG. 8B.

FIG. 8D shows how the values of the image signal components of the soft tissue image signal S2, which has been generated with Formula (2), are distributed. The soft tissue image signal S2 is primarily composed of the image signal components, which represent the soft tissue patterns and have approximately uniform values. However, the soft tissue image signal S2 includes more random noise components than the first image signal SO1 shown in FIG. 8A and the second image signal SO2 shown in FIG. 8B.

FIG. 8E shows how the values of the image signal components of the bone image signal S1, which may be generated with Formula (1), are distributed. (In this example, the bone image signal S1 need not be generated.) The bone image signal S1 is primarily composed of the image signal components, which represent the bone patterns and have values changing step-wise. However, like the soft tissue image signal S2 shown in FIG. 8D, the bone image signal S1 includes more random noise components than the first image signal SO1 shown in FIG. 8A and the second image signal SO2 shown in FIG. 8B.

As illustrated in FIG. 7, a smoothing process 51 is carried out on the soft tissue image signal S2, which represents the soft tissue image 47 and is distributed as shown in FIG. 8D. From the smoothing process 51, a smoothed soft tissue image signal $\overline{S2}$ is obtained, which represents a smoothed soft tissue image 61 and is distributed in the pattern shown in FIG. 8F. With the smoothing process 51, the spatial frequency components higher than a frequency of, for example, 1.0 cycle/mm are eliminated from the soft tissue image signal S2 representing the soft tissue image 47.

Thereafter, the superposition image signal SO and the smoothed soft tissue image signal $\overline{S2}$ are weighted, and the weighted smoothed soft tissue image signal $\overline{S2}$ is subtracted from the weighted superposition image signal SO. In this manner, a bone image signal S1' is obtained, which represents a bone image 62. As illustrated in FIG. 8G, the bone image signal S1' includes less random noise components than the bone image signal S1 shown in FIG. 8E. However, the bone image signal S1' slightly includes the high spatial frequency components of the soft tissue image 47 due to the smoothing process carried out on the soft tissue image 47.

A smoothing process 52 is then carried out on the bone image signal S1', which has been generated in the manner described above. With the smoothing process 52, patterns having low contrast and falling within the spatial frequency region higher than, for example, 0.5 cycle/mm are eliminated from the bone image 62 (i.e. small changes in the bone image signal S1' are eliminated). For this purpose, by way of example, the bone image signal S1' may be processed with a filter described below. Specifically, a window having an area corresponding to 0.5 cycle/mm is determined for a predetermined picture element P0. From the image signal components of the bone image signal S1' representing the picture elements belonging to the window, the image signal components are then found the values of which fall within the range of:

the value of an image signal component S1o' representing the predetermined picture element P0 ±a predetermined value.

Thereafter, the mean value of the image signal components, which have thus been found, is calculated and employed as the value of a new image signal component S1o' representing the predetermined picture element P0. With the smoothing process 52, a smoothed bone image signal S1' is obtained which represents a smoothed bone image 63. As illustrated in FIG. 8I, in the smoothed bone image signal S1', the noise components have been reduced. Also, the high spatial frequency components of the soft tissue image 47 due to the smoothing process carried out on the soft tissue image 47 have been reduced. However, the rising part of the smoothed bone image signal S1' becomes unsharp.

Thereafter, the superposition image signal SO and the smoothed bone image signal S1' are weighted, and weighted smoothed bone image signal S1' subtracted from the weighted superposition image signal SO. In this manner, a soft tissue image signal S2' is obtained which represents a soft tissue image 64. As illustrated in FIG. 8H, the soft tissue image signal S2' includes less noise components than the soft tissue image signal S2 shown in FIG. 8D. Also, because the rising part of the smoothed bone image signal S1' shown in FIG. 8I is unsharp, the information representing the corresponding part of the bone image is included as noise in the soft tissue image signal S2'. However, the level of random noise and the level of the information, which represents the bone image and constitutes noise, are very low. Therefore, a series of the processes may be finished in this step. The soft tissue image signal S2' may be fed into the CRT display device 32 of the image processing and displaying apparatus 30 shown in FIG. 11, and a visible image may be reproduced from the soft tissue image signal S2' and displayed on the CRT display device 32.

However, in this example, the same processes as those described above are repeated even further such that an image having better image quality may be obtained.

After the soft tissue image signal S2' representing the soft tissue image 64 has been generated, a smoothing process 53 is carried out on the soft tissue image signal S2'. From the smoothing process 53, a smoothed soft tissue image signal $\overline{S2'}$ is obtained, which represents a smoothed soft tissue image 65 and is distributed in the pattern shown in FIG. 8J. With the smoothing process 53, the spatial frequency components higher than a frequency of, for example, 1.5 cycle/mm are eliminated from the soft tissue image signal S2'.

Thereafter, the superposition image signal SO and the smoothed soft tissue image signal $\overline{S2'}$ are weighted, and the weighted smoothed soft tissue image signal $\overline{S2'}$ is subtracted from the weighted superposition image signal SO. In this manner, a bone image signal S1" is obtained, which represents a bone image 66. As illustrated in FIG. 8K, the bone image signal S1" includes less random noise components and less information, which represents the soft tissue image and constitutes noise, than the bone image signal S1' shown in FIG. 8G. In cases where a bone image is to be reproduced, a visible image may be reproduced from the bone image signal S1" and reproduced on the CRT display device 32.

In this example, a smoothing process 54 is then carried out on the bone image signal S1", which has been generated in the manner described above. From the smoothing process 54, a smoothed bone image signal $\overline{S1''}$ is obtained, which represents a smoothed bone image 67 and is distributed in the pattern shown in FIG. 8M. With the smoothing process 54, patterns having low contrast and falling within the spatial frequency region higher than, for example, 1.0 cycle/mm are eliminated from the bone image 66.

Thereafter, the superposition image signal SO and the smoothed bone image signal $\overline{S1''}$ weighted, and weighted smoothed bone image signal $\overline{S1''}$ is subtracted from the weighted superposition image signal SO. In this manner, a soft tissue image signal S2" is obtained.

As illustrated in FIG. 8L, the soft tissue image signal S2" includes less random noise components and less information, which represents the bone image and constitutes noise, than the soft tissue image signal S2' shown in FIG. 8H.

In the manner described above, the smoothing processes and the weighting subtraction processes with respect to the superposition image signal SO (original image signal) are carried out repeatedly such that the bone images and soft tissue images, in which noise has been reduced sequentially, may be obtained alternately.

Figure 9:
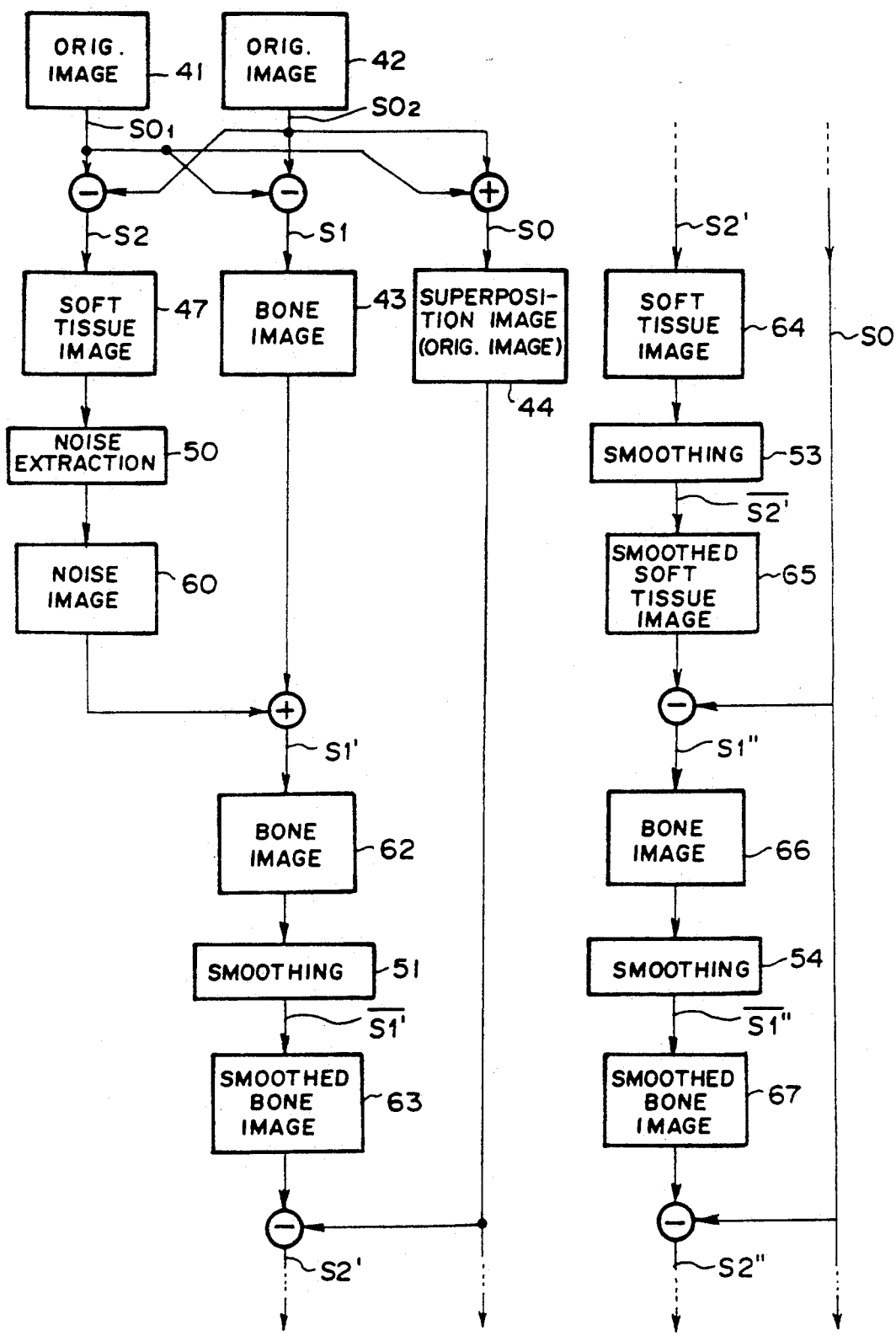
FIG. 9 is a flow chart showing the processes, which are substantially identical with those shown in FIG. 7.

FIG. 9 is a flow chart showing the processes in a still further example, which processes are substantially identical with those shown in FIG. 7. In FIG. 9, similar elements are numbered with the same reference numerals with respect to FIG. 7.

In the example of FIG. 9, the series of the processes for generating the bone image 62 in the example of FIG. 7 (which processes correspond to the processes described above with reference to FIG. 2, except that the bone image and the soft tissue image are interchanged with each other) are replaced by the processes described above with reference to FIG. 6. In the example of FIG. 9, the bone image and the soft tissue image in the processes shown in FIG. 6 are interchanged with each other. As described above, the example of FIG. 9 is substantially identical with the example of FIG. 7.

In the example of FIG. 9, only the initial processes in the example of FIG. 7 are replaced by the processes described above with reference to FIG. 6. Such replacement may be carried out at an arbitrary stage of the processes carried out repeatedly. Such embodiments are substantially identical with the example of FIG. 7. The method for forming an energy subtraction image in accordance with the present invention is applicable to various such, substantially identical examples of the graininess improving energy subtraction processing wherein at least one stage of the processes is modified.

In the aforesaid embodiments of the method for forming an energy subtraction image in accordance with the present invention, a soft tissue image or a bone image is formed from X-ray images of the chest of a human body. However, the method for forming an energy subtraction image in accordance with the present invention is not limited to the formation of the soft tissue image or the bone image, but is applicable widely when either one or both of two images are to be obtained, in which the patterns of two different tissues of a single object have been emphasized or only such patterns are illustrated. For example, two such images may be an image, in which the patterns of mammary glands have been emphasized, and an image, in which the pattern of a malignant tumor has been emphasized.

Also, in the aforesaid embodiments of the method for forming an energy subtraction image in accordance with the present invention, stimulable phosphor sheets are used. However, the method for forming an energy subtraction image in accordance with the present invention is also applicable when other recording media, such as X-ray film (ordinarily combined with intensifying screens), are used.

What is claimed is:

1. An energy subtraction processing method in which:
   i) a filter for filtering out radiation having a low energy level is located between a first recording medium and a second recording medium in order to separate radiation having a high energy level and radiation having a low energy level from each other,
   ii) radiation, which has passed through an object, is then irradiated to the combination of the first recording medium, the filter, and the second recording medium, from the side of the first recording medium such that only the radiation having a high energy level may impinge upon the second recording medium, radiation images of the object being thereby recorded on the first recording medium and the second recording medium,
   iii) the radiation images of the object are read out from the first recording medium and the second recording medium, image signals representing the radiation images of the object being thereby obtained, and
   iv) the image signals representing the radiation images of the object are subtracted from each other, an image signal representing an energy subtraction image being thereby obtained,
   wherein the subtraction process is not carried out on high frequency components of the image signals representing the radiation images of the object and is carried out only on low frequency components of the image signals representing the radiation images of the object such that an image signal representing an energy subtraction image having improved graininess may be obtained,
   a method for forming an energy subtraction image comprising the steps of:
   a) utilizing a stimulable phosphor sheet as said filter for filtering out radiation having a low energy level, and
   b) adding high frequency components of an image signal, which represents image information stored on said stimulable phosphor sheet, to said image signal representing said energy subtraction image, whereby an image signal representing an energy subtraction image, the graininess of which has been improved even further, is obtained.

2. An energy subtraction processing method in which:
   i) a filter for filtering out radiation having a low energy level is located between a first recording medium and a second recording medium in order to separate radiation having a high energy level and radiation having a low energy level from each other,
   ii) radiation, which has passed through an object, is then irradiated to the combination of the first recording medium, the filter, and the second recording medium, from the side of the first recording medium such that only the radiation having a high energy level may impinge upon the second recording medium, radiation images of the object being thereby recorded on the first recording medium and the second recording medium,
   iii) the radiation images of the object are read out from the first recording medium and the second recording medium, image signals representing the radiation images of the object being thereby obtained, and
   iv) the image signals representing the radiation images of the object are subtracted from each other, an image signal representing an energy subtraction image being thereby obtained, wherein the subtraction process is not carried out on high frequency components of the image signals representing the radiation images of the object and is carried out only on low frequency components of the image signals representing the radiation images of the object such that an image signal representing an energy subtraction image having improved graininess may be obtained, a method for forming an energy subtraction image comprising the steps of:

a) utilizing a stimulable phosphor sheet as said filter for filtering out radiation having a low energy level, and b) adding high frequency components of an image signal, which represents image information stored on said stimulable phosphor sheet, to said image signal representing said energy subtraction image, whereby an image signal representing an energy subtraction image, the graininess of which has been improved even further, is obtained, wherein, the high frequency components of said image signal, which represents the image information stored on said stimulable phosphor sheet, are added to said image signal representing said energy subtraction image, said image signal representing said energy subtraction image is passed through a frequency filter for reducing a high frequency, said image signal, which represents the image information stored on said stimulable phosphor sheet, is passed through a high frequency pass filter, and thereafter the image signal, which has passed through the frequency filter for reducing a high frequency, and the image signal, which has passed through the high frequency pass filter, are added to each other.

3. A method as defined in claim 1 wherein the sum of responses of two said filters is equal to 1 over the whole frequency range.

4. A method as defined in claim 1 wherein said image signal, which represents image information stored on said stimulable phosphor sheet, is obtained by exposing said stimulable phosphor sheet to stimulating rays, which cause said stimulable phosphor sheet to emit light in proportion to the amount of energy stored thereon during its exposure to the radiation, and photoelectrically detecting the emitted light.

5. A method as defined in claim 4 wherein said stimulating rays are a laser beam.

6. A method as defined in claim 1 wherein said recording media are stimulable phosphor sheets.

7. A method as defined in claim 6 wherein each of said image signals representing said radiation images of the object recorded on said recording media is obtained by exposing each said stimulable phosphor sheet to stimulating rays, which cause said stimulable phosphor sheet to emit light in proportion to the amount of energy stored thereon during its exposure to the radiation, and photoelectrically detecting the emitted light.

8. A method as defined in claim 7 wherein said stimulating rays are a laser beam.

9. A method as defined in claim 1 wherein said recording media are photographic film.

* * * * *